United States Patent Office.

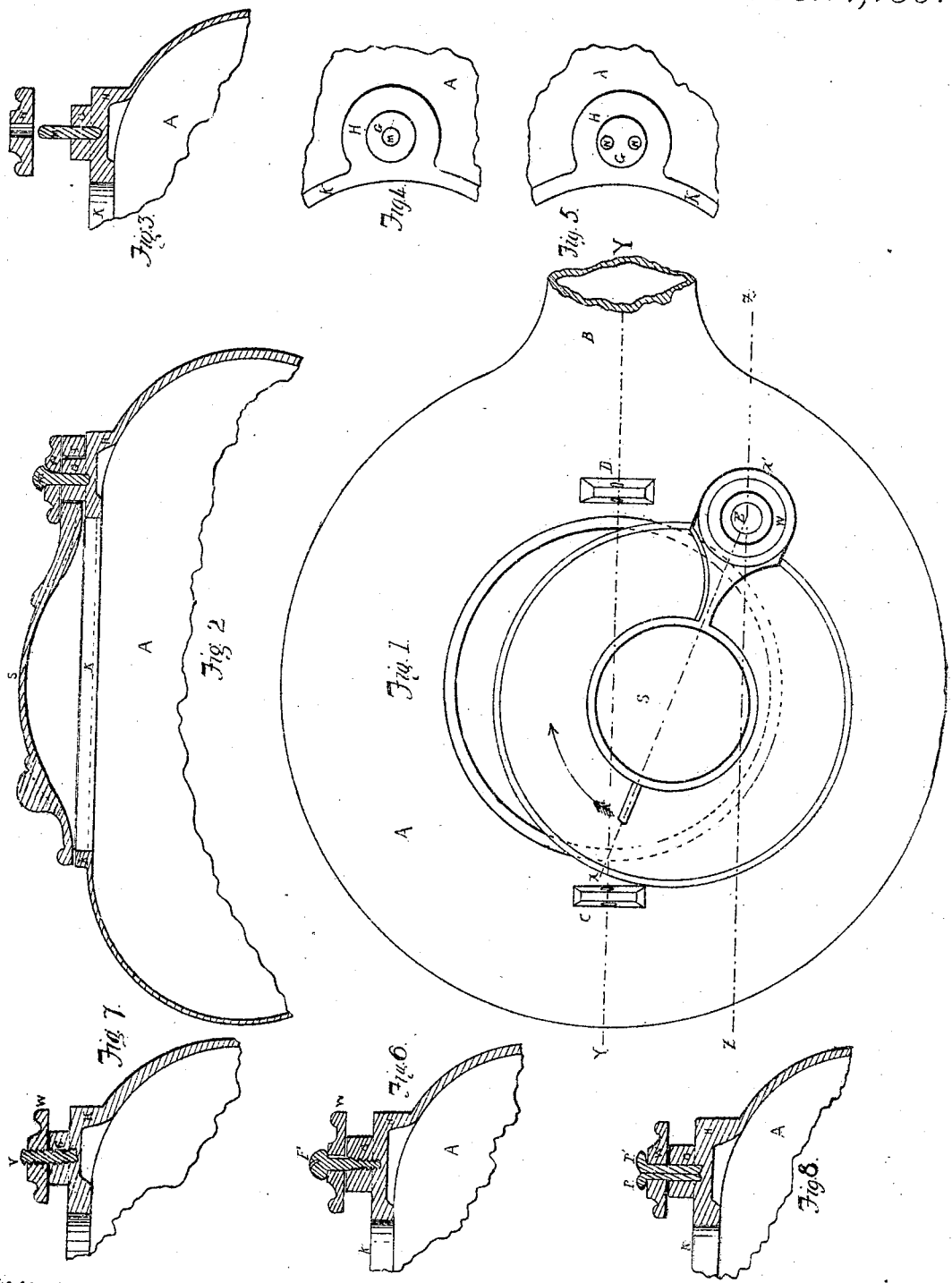

CHARLES FOWNES, OF PITTSBURG, PENNSYLVANIA.

Letters Patent No. 72,279, dated December 17, 1867; antedated December 11, 1867.

IMPROVEMENT IN HINGING TEA-KETTLE COVERS.

The Schedule referred to in these Letters Patent and making part of the same.

TO ALL WHOM IT MAY CONCERN:

Be it known that I, CHARLES FOWNES, of the city of Pittsburg, in the county of Allegheny, and State of Pennsylvania, have invented certain Improvements in Tea-Kettles; and I do hereby declare that the following is a full and exact description thereof, which will enable others skilled in the art to make and use my invention, reference being had to the accompanying drawings, in which—

Figure 1 is a top view of my improved tea-kettle.
Figure 2 is a sectional view of the same through the line $xx'$.
Figure 3 is a part of the same view as fig. 2 for explanation.
Figure 4 is a part of my tea-kettle in plan.
Figure 5 is the same as fig. 4, with a different fastening.
Figure 6 is the same part as fig. 3, with another fastening.
Figure 7 is again the same part, also with another fastening; and
Figure 8 is still another fastening.

This invention relates to that class of tea-kettles which have a sliding lid fastened thereon, and it consists, first, in the way the sliding lid is hung, so as to be more convenient; and secondly, in the modes of fastening said lid to the kettle to make a neat and economical article.

In the tea-kettle, where the lid is hung or pivoted so as to slide around a centre which is in a line with the spout and bail of the kettle, if, in pouring out water, the tea-kettle is in the least tilted or careened sideways, the lid will naturally be displaced to the right or to the left, by reason of its gravitating, and much annoyance arises from the steam issuing from the tea-kettle on the hand of the operator. To overcome entirely this difficulty, I have cast a knob or disk on my kettle, on one side of the bail-lug or ear, which is nearest to the spout of the kettle, and I have hung or pivoted my lid to that knob, so that the lid will always have a tendency to closing spontaneously when the tea-kettle is tilted for pouring out water from the spout.

A is the body of my tea-kettle. B is the spout. C is the back lug or ear. D is the front lug or ear for securing the bail. E is the centre, around which the lid is made to pivot, and which is located to the right or to the left of the bail-ear D nearest to the spout. This centre, E, is formed of a raised knob, G, and of a shelf or ledge, H, cast all of one piece with the body of the tea-kettle, so that the top surface of the ledge H will be on a level or be flush with the top of the rim K of the tea-kettle, and the height of the knob G, from the ledge H to its top, will be such as to correspond with the thickness of the lid T, or of that part which acts as a ring for the lid S. The place of the knob G and centre, E, is not a matter of fancy or taste; it should be located, as represented in my drawings, so that the lid, in pivoting on the said centre, E, and lug, G, will swing clear of the bail-lug C to open the kettle; and it must be out of the line of the spout and bail enough to cause the lid to gravitate, slide round, and close the kettle by coming in contact with the stop L when the kettle is tilted to pour water out of the spout. W is a washer, having one or more holes at or near its centre, according to the kind of fastening employed to hold the lid in place.

The following are the fastenings which I have employed:

First. The one represented by figs. 2, 3, and 4, which consists in having a pin or rivet, or square piece, or flat piece of metal, soft and malleable, M, cast in or chilled in the centre of the knob G. When the lid is placed on, the washer W is slipped on the piece M, (see figs. 3 and 2,) and the piece M is riveted over the washer W, which terminates the operation.

Second. If it is desired, two or more pins or rivets N N can be used instead of only one, and they will act and answer the same purpose.

Third. Instead of a solid piece of metal, or of a rivet, two or more pieces of metal, or one piece of metal split P, can be cast or chilled in the knob G, (see fig. 8,) and after the washer W is slipped over them they can be bent to clinch and hold the washer and fasten the lid.

Fourth. In fig. 7 is represented another mode of fastening the lid, which is to cast in the centre of the knob G a piece of metal, V, having a screw cut upon it, and tapping the washer as a nut to correspond thereon.

Fifth. My fifth mode of fastening the washer is by casting the knob G solid, and drilling a hole through its centre to insert a screw, F, through the washer W.

Either of the five modes I have described can be used to secure my washer and prevent my lid from being thrown out of its proper position on the shelf H and around the knob G.

L is a small catch or knob, cast all of one piece with the body of the kettle, against which the lid S strikes when it is in the proper position for closing the kettle, so that when the kettle is tilted, for pouring out water from the spout, the lid will be prevented by the said catch L from sliding past the proper place for closing the kettle.

The lid S is perfectly straight underneath, and it has no catch cast thereunto, such as appeared in my first model, this catch having been left thereunto by mistake, which mistake was rectified in the whole kettle sent by request of the Patent Office to replace the part of kettle first sent.

*Operation.*

To understand clearly the object I have in view in placing the centre or pivoted part of my sliding lid at E, on my improved tea-kettle, we should imagine the kettle tilted so as to pour out water from the spout B, so that the part B is much lower than the part C. I have drawn a line, Y Y', through the centre of the bail and spout, and also one, Z Z, parallel to it, through the centre where the lid is pivoted. Now, if the kettle is tilted, as we have supposed it to be, it is evident that if the lid is occupying a position as represented in fig. 1, it will gravitate in the direction of the arrow, and it will close itself spontaneously by swinging around the centre, E, until it comes in contact with the knob or catch L, which will stay its swinging motion and keep it in the proper position for closing the kettle, and in order that it should swing open by tilting sideways the tea-kettle, it would have to swing far enough to bring its centre of gravity in a line with the line Z Z, and to pass that line.

What I claim as my invention, and that I desire to secure by Letters Patent of the United States, is—

1. Swinging the lid of a tea-kettle around a centre placed or located to the right or to the left of the bail-ear D, out of the centre line of the spout, and nearer to the spout than to the back of the tea-kettle, so that the lid in pivoting around that centre will swing clear of the bail-lug G without being elevated to pass over it, as set forth.

2. The combination of the pin M or pins N N with the knob G, or its equivalent.

3. The combination of the split piece P or pieces P P' with the knob G.

4. The combination of the screw V cast or chilled in with the piece G.

5. The combination of the washer W with the pieces M, N N, P P', V, and the knob G and rim H, used for the purpose set forth.

6. Securing the lids of tea-kettles by means and with the use of the screw F, bolt V, pin M, pins N N, or pieces P P', as described.

CHAS. FOWNES. [L. S.]

Witnesses:
   H. P. GENGEMBRE,
   PHILIP R. KINCAID.